United States Patent

[11] 3,617,033

[72] Inventors Yataro Ichikawa;
Michiyuki Tokashiki; Tadashi Ono, all of Iwakuni-shi, Japan
[21] Appl. No. 772,733
[22] Filed Nov. 1, 1968
[45] Patented Nov. 2, 1971
[73] Assignee Teijin Limited
Osaka, Japan

[54] APPARATUS FOR CONTINUOUS GAS-LIQUID CONTACT
13 Claims, 21 Drawing Figs.
[52] U.S. Cl. .................................................. 261/21,
23/283, 23/284, 23/285, 260/525, 261/77, 261/123
[51] Int. Cl. ................................................... B01f 3/04,
B01j 1/00, C07c 51/42
[50] Field of Search ........................................... 23/283,
285, 284; 261/21, 77, 123, 126; 260/525

[56] References Cited
UNITED STATES PATENTS
894,792    7/1908  Eschellmann et al. ........   23/283 X
1,625,195  4/1927  Dickey ........................   261/77 UX
2,340,690  1/1944  Richardson et al. ..........   23/283 UX
2,982,578  5/1961  Gunderson et al. ...........  23/283 X
3,509,203  4/1970  Michaelis et al. .............   23/283 X
642,460    1/1900  Kersten .......................   261/77 X FOREIGN PATENTS
545,979    9/1957   Canada .......................  23/283
68,634     2/1959   Denmark .....................   23/285
912,672   10/1946   France ........................  23/285

Primary Examiner—Morris O. Wolk
Assistant Examiner—Barry S. Richman
Attorney—Sherman and Shalloway ABSTRACT: A gas-liquid contacting apparatus including a vertical vessel divided in the vertical direction into at least two sections by at least one tapered partition wall; each of the sections is constructed such that the material contained in one section may be conducted successively to the bottom or lower portion of the other section by an opening provided at the bottom of the partition wall or by a conduit which extends through two sections and has an end downstream of a fluid which opens into the lower portion of the other section; the first section comprises a supply pipe for supplying liquid or suspension and a pipe for feeding a desired gas into the lower part of the section: and the last section includes at least one exhaust opening for withdrawing the treated liquid or suspension and gas. The apparatus is particularly useful for refining of crude terephthalic acid by contacting a suspension thereof with molecular oxygen.

PATENTED NOV 2 1971 3,617,033

APPARATUS FOR CONTINUOUS GAS-LIQUID CONTACT

This invention relates to an apparatus for continuous, intimate contacting of a liquid and a gas, particularly for use in a process for refining crude terephthalic acid to a high purity.

Heretofore, bubbling towers, plate towers, agitating vessels, packed towers or spary towers have been used to contact a gas with a liquid.

The bubbling towers are widely used for industrial purposes because they provide good contact of a gas with a liquid phase consisting of a liquid, solution or suspension, but bubbling towers are not suitable when a high reaction ratio and a high efficiency of contact between the liquid phase and gas are desired, since nearly a complete mixing is done in the liquid phase. When solid particles are suspended in a liquid, a great quantity of gas becomes necessary in order to lift the solid particles. This results in increased power for supplying the gas and increased cost for constructing the tower. Hence, the bubbling towers are uneconomical when a great guantity of gas is not substantially need in conducting a gas-liquid contact.

The plate towers provide a good efficiency to contact between a gas and a liquid, and if many plates are installed, it is possible to make the flow of a liquid phase take a form close to the plug flow. When the plate tower is operated under high pressure, however, there is a great pressure drop between the trays, and if the tower has an overflow weir, it is necessary to enlarge spaces between the plates. Furthermore, when solid particles are suspended in the liquid, the particles are deposited onto gas-blow openings on the trays, thus clogging them. This tends to cause the deviation of a gaseous stream or the precipitation of the solid particles, making the operation unstable. A plate tower having no overflow weir dam or one having baffle plates ocrresponding to the trays is not restricted by the pressure drop between the plates, but when solid particles are suspended in the liquid, the solid particles differ in residence time for the liquid. Such a type of tower is therefore unsuitable if there is a restriction on the residence time of the solid and the liquid.

The agitating vessels provide almost a complete mixing inside when a mechanical agitation is employed. If a high reaction ratio or a high efficiency of contact between a liquid and a gas are desired, it is necessary to connect a plurality of vessels in a series. This poses a problem with respect to economy and maintenance.

The packed towers and spray towers cannot give a prolonged residence time of the liquid, and are unsuitable when an absorption efficiency or conversion of the liquid and gas is desired to be maintained high or when solid particles are suspended in a liquid.

The invention provides a gas-liquid contacting apparatus which is free from the foregoing defects of the conventional apparatuses, and which makes it possible to obtain a high reaction ratio, high efficiency of contact between a liquid and a gas and high capacity efficiency of the apparatus with a stable operation. The apparatus of the invention is particularly effective when the velocity of a gas stream is relatively low, or when solid particles are present in the liquid.

According to the invention, the foregoing objects and advantages are achieved by a gas-liquid contact apparatus including a vertical vessel equipped with a tapered bottom, a pipe for supplying a liquid or suspension, an opening for feeding a gas to be contacted with the liquid suspension, and at least one opening for withdrawing the liquid or suspension, wherein the vessel is divided the vertical direction into at least two superposed sections by at least one tapered partition wall; each of the section being constructed such that the material contained in one section may be conducted successively to the bottom or lower portion of the other section by an opening provided at the bottom of the partition wall or by a conduit which extends through two sections and has an end downstream of a fluid which opens into the lower portion of the other section; the first section comprises a supply pipe for supplying liquid or suspension and a pipe for feeding a desired gas into the lower part of the first section; and the last section includes at least one exhaust opening for withdrawing the treated liquid or suspension and gas.

The apparatus of the invention will further be described below with reference to the accompanying drawings which are presented to illustrate several modes of the apparatus of the invention, and are not intended to be limiting.

FIGS. 1 to 6 show various examples of the shape of the partition wall or bottom of the apparatus of the invention, $a$ being indicative of a plan view of each example and $b$, of a vertical section thereof.

In the drawings, the same reference numerals represent the same parts.

Figure 1A:
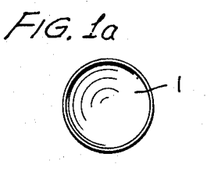
Figure 1B:
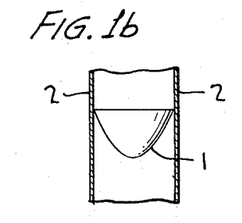
Figure 2A:
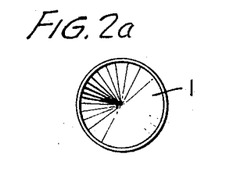
Figure 2B:
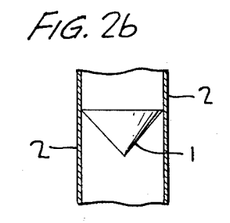
Figure 3A:
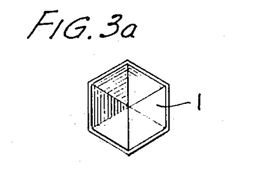
Figure 3B:
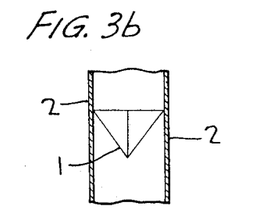
Figure 4A:
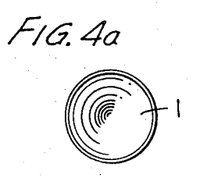
Figure 4B:
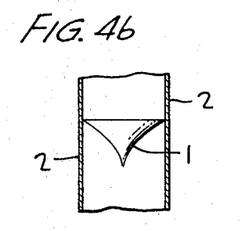
Figure 5A:
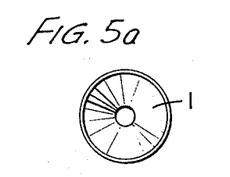
Figure 5B:
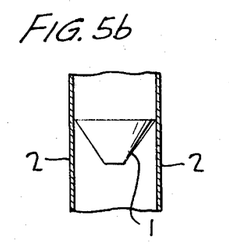
Figure 6A:
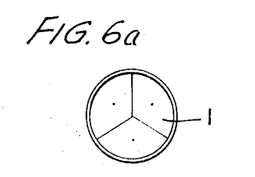
Figure 6B:
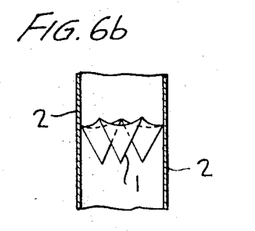

The vertical apparatus of the invention is divided into at least two sections by partition walls. There is no particular restriction on the number of these sections, but usually preferably are three to 50, particularly four to 20, sections. The suitable number of sections is dependent upon the mixing properties of a liquid or suspension side, the d desired reaction ratio, the desired efficiency of contact between the liquid phase and gas, etc. The only requirement for the partition wall used in the apparatus of the invention is that it should be tapered downwards. For instance, it may be of various shapes as shown in FIGS. 1 to 6. In FIGS. 1 to 6, the reference numeral 1 represents a partition wall, and 2, a sidewall of the vessel of the apparatus of the invention. The partition wall may be of a missile shape as shown in FIGS. 1$a$ and 1$b$, a circular cone shape as shown in FIGS. 2$a$ and 2$b$, a hexagonal cone shape as shown in FIGS. 3$a$ and 3$b$, a concave circular cone shape as shown in FIGS. 4$a$ and 4$b$, a trapezoid shape in section as shown in FIGS. 5$a$ and 5$b$, or of a polygonal cone shape as shown in FIGS. 6$a$ and 6$b$. Also, the conical surface of these types of partition wall may be replaced in part by a curved or plane surface. When using a conical surface; the vertical angle or apex angle is generally 120° or less, preferably 90° or less. There is no lower limit to the vertical angle but restriction is naturally imposed in view of the structure. Generally, the lower limit is 15°, preferably 30°, and more preferably 45°.

Figure 7:
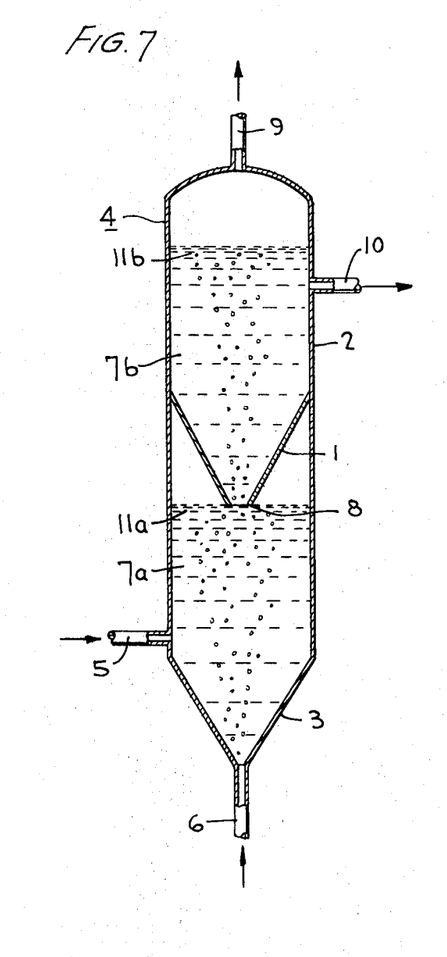
FIGS. 7 to 13 are vertical section views illustrating schematically various examples of the gas-liquid contacting apparatus of the invention.
Figure 8:
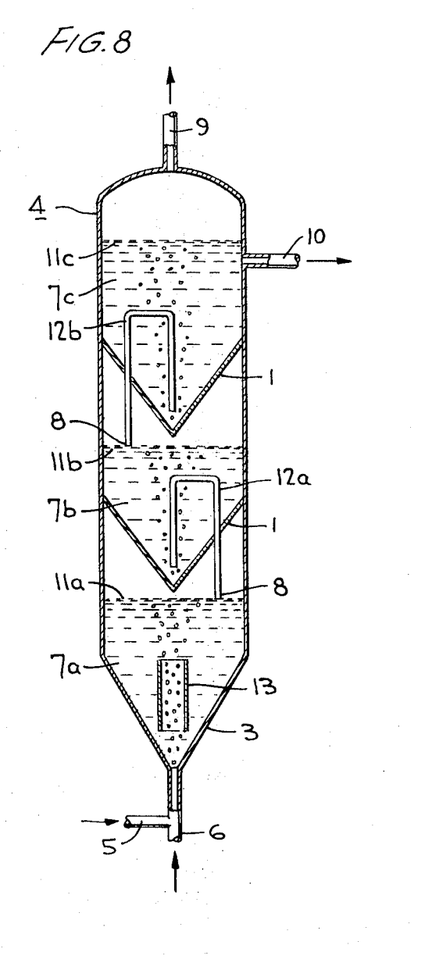
Figure 10:
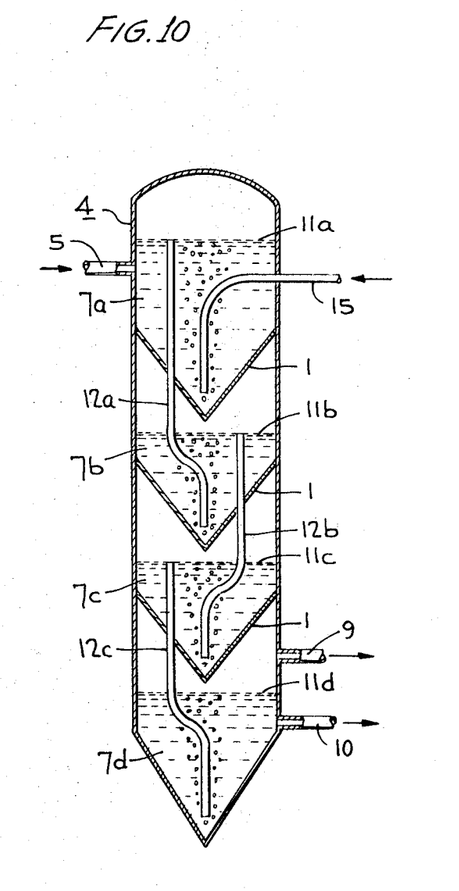

The material may be transferred from one section to another by an opening 8 provided at the bottom of the tapered partition wall 1 as shown in FIG. 7 or a conduit as shown in FIGS. 8 and 10.

With reference to FIG. 7, the inside of vessel 4 closed at the upper portion and comprising a sidewall 2 and a conical bottom 3 which is tapered downwards is divided by the partition wall 1 into section 7$a$ and section 7$b$. A liquid or suspension is fed into section 7$a$ from a supply pipe 5 opening into the sidewall of section 7$a$. A gas supply pipe 6 is provided at the lower end of tapered bottom 3, from where oxygen, air or other suitable gas is fed into section 7$a$ of the vessel 4. Thus, section 7$a$ constitutes the first region into which a liquid or suspension and a gas are fed for the first time. The liquid or suspension fed into section 7$a$ forms a circulating stream by the gas-lift effect of a gas supplied from the lower portion, whereby the liquid or suspension is thoroughly mixed and contacted with the gas. The liquid or suspension and the gas in section 7$a$ then flow into the second section 7$b$ through the opening 8 provided at the bottom of the partition wall 1. A circulating stream of the liquid or suspension also occurs in section 7$b$ by the gas-lift effect, and a sufficient mixing of the liquid side with the gas is conducted. The gas is separated from the liquid or suspension in section 7$b$, and is discharged from a gas-exhaust port 9. On the other hand, the liquid or suspension is withdrawn out of the system through a pipe 10. The reference numerals 11$a$ and 11$b$ $l$ respectively indicate the surface of the liquid in section 7$a$ and section 7$b$.

Thus, according to the apparatus of FIG. 7 which shows one embodiment of the present invention, when a liquid or suspension and a gas are fed successively from supply pipes 5 and 6, the liquid or suspension forms a circulating stream is contacted intimately with the gas in sections 7a and 7b, followed by continuous withdrawal of them from the system. This does not necessitate any particular means such as mechanical agitation.

FIG. 8 shows another embodiment of the apparatus of the invention. In FIG. 8, three section are formed within the vessel 4 by two partition walls 1, i.e., the first section 7a, second section 7b and third section 7c. The two partition walls do not contain openings, and the material within section 7a flows into the lower portion of section 7b through a conduit 12a opened at both ends. The material within section 7b flows into the lower portion of section 7c through a conduit 12b. By lower portion is meant not only the lower end of the tapered partition but any position within the entire tapered partition. The entrance of the conduits 12a and 12b respectively defines the level of the liquid surfaces 11a and 11b. A hollow guide cylinder 13 opened at both ends is disposed in the upper portion of the opening portion of the gas feed pipe which is opened into the lower end of section 7a. The guide cylinder 13 promotes the circulation of liquid or suspension within section 7a. By the provision of the guide cylinder 13, therefore, solid particles are well dispersed and suspended in the liquid, especially when a suspension is handled. In the embodiment of FIG. 8, a liquid or suspension fed from the supply pipe 5 and a gas fed from the supply pipe 6 are fed from the lower end of section 7a in a premixed state.

Figure 9:
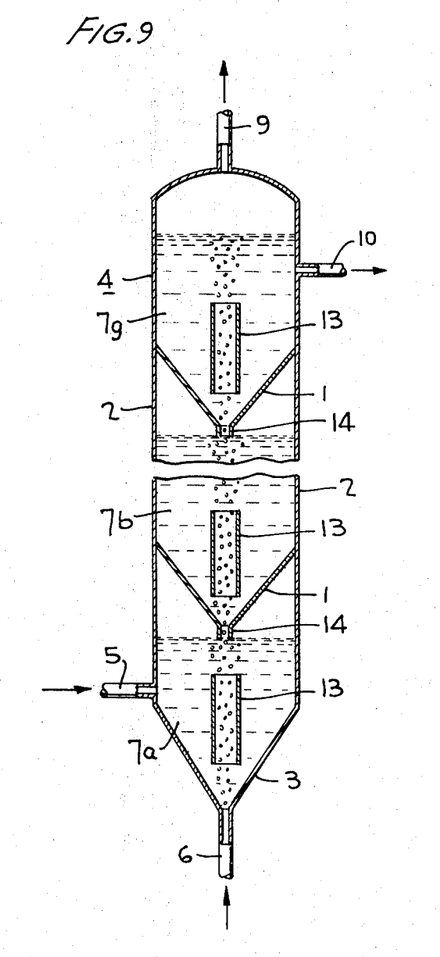

The apparatus of FIG. 9 is the same in structure as that of FIG. 7 except that a downwardly extending short pipe 14 is provided at the opening portion of the bottom of the partition walls 1, that a hollow guide cylinder 13 is provided above the opening portion of each partition wall, and that the vessel 4 is divided into seven sections by six partition walls. In this apparatus, a liquid or suspension and a gas fed from supply pipes 5 and 6 respectively pass sequentially through sections 7a, 7b ..... 7g, and are withdrawn out of the system through the pipe 10 and pipe 9, respectively. The provision of the hollow guide cylinder 13 in each section promotes the circulation of the liquid or suspension. If desired, the provision of a guide cylinder may be omitted in a desired number of sections.

In the apparatus of FIG. 10, the first section 7a, second section 7b, third section 7c and fourth section 7d are formed within the vessel 4 by three partition walls 1. A liquid or suspension is fed into section 7a through the supply pipe 5 opened into the sidewall of section 7a, and a gas fed into the lower portion of section 7a through a conduit 15. The liquid or suspension is withdrawn by pipe 10 provided in the lowermost section 7d, and the gas is discharged out of the system through pipe 9 provided in the section 7d. The three partition walls 1 do not include openings. The material within section 7a flows into the lower portion of section 7b through conduit 12a opened at both ends. The material within section 7b flows into the lower portion of section 7c through conduit 12b, and the material within section 7c flows into the lower portion of section 7d through conduit 12c. The entrance of each of the conduits 12a, 12b and 12c defines the level of liquid surfaces 11a, 11b, 11c and 11d of sections 7a, 7b, 7c and 7d. As a matter of course, it is possible to decrease or increase the number of partition walls in the apparatus of FIG. 10.

Figure 11:
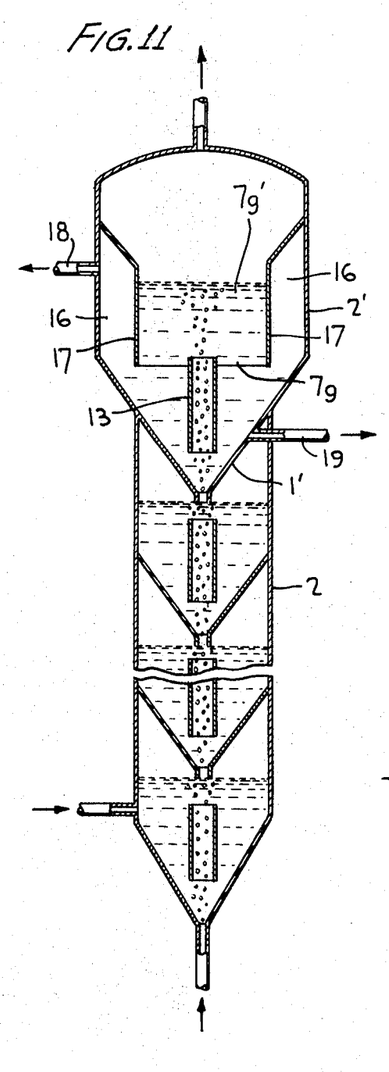

FIG. 11 shows a structure wherein a settling zone 16 is provided in the last zone 7g of the apparatus of FIG. 9. When a suspension is treated with the use of this type of apparatus, it is possible to recover from the last zone a suspension of a high concentration and a liquid with a small content of solid particles separately from each other. In the last zone 7g of FIG. 11, the tapered partition wall 1' projects beyond the sidewall 2 of the vessel 4, and together with the sidewall 2', this section has a larger inner capacity than any other section. Within this section is provided a partition plate 17 made of a concentric cylinder closed at the upper portion. The lower end of the partition plate 17 is spaced from the partition wall 1', and a settling zone 16 of a doughnut shape in section is formed between the partition plate 17 and the inner wall of the sidewall 2'. Thus, in the section 7g, circulating streams of the liquid phase and the gas occur in section 7g' surrounded by the partition plate 17. In the settling zone 16, the liquid is separated from the solid particles suspended in it. The solid particles are then transferred into section 7g'. Thus, the liquid becomes a suspension of high concentration in section 7g', and in the upper portion of the settling zone, a liquid with a small content of solid particles. Therefore, it is possible to withdraw the liquid with a small content of solid particles from a withdrawal port 18, and a high concentration suspension containing solid particles from section 7g'. The outer diameter of the side wall 2' of the settling zone 16 may be the same as that of the sidewall 2 of other section, but preferably larger in order to actuate it effectively.

Figure 12:
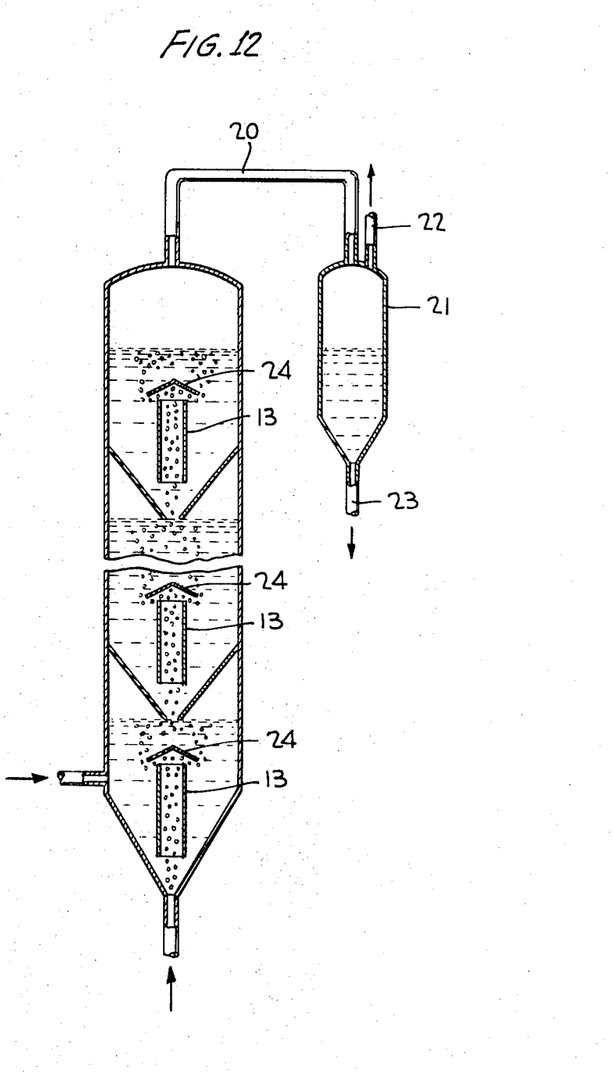

In the apparatus shown in FIG. 12, liquid or suspension and gas are simultaneously withdrawn by an exhaust pipe 20, and the liquid or suspension is separated from the gas by a gas-liquid separator 21 provided outside the vessel 4. The gas is discharged from a pipe 22 provided in the upper portion of the gas-liquid separator 21, and the liquid or suspension is withdrawn from a pipe 23 provided at the lower portion thereof.

A baffle plate 24 may be provided above a guide cylinder 13 with some space therebetween in each of the sections. The provision of the baffle plate 24 is preferable because it can prevent the short pass of liquid between the sections.

We have now found that by using the above-described gas-liquid contacting apparatus of the invention, it is possible to refine crude terephthalic acid with a simple operation, thereby obtaining terephthalic acid of high purity.

In the conventional manufacture of a fiber- and film-forming linear polyester consisting mainly of ethylene terephthalate, such as polyethylene terephthalate, an ester-interchange between ethylene glycol and dialkyl terephthalate is conducted. The reason is that terephthalic acid is difficult to refine, but dialkyl terephthalate can be refined with relative ease by such a procedure as recrystallization and distillation. Such a method, however, is roundabout in that terephthalic acid should first be esterified with an alkyl alcohol such as methyl alcohol, and then transesterified with ethylene glycol. It is apparent therefore that the preparation of polyethylene terephthalate by direct reaction of terephthalic acid with ethylene glycol is advantageous. In order, however, that polyethylene terephthalate obtained by such a direct esterification may have an excellent whiteness and transparency and be commercially valuable, it is imperative that the starting terephthalic acid should be highly pure.

Among the methods of preparing terephthalic acid now being commercially practiced are a nitric acid oxidation method and air oxidation method in which p-yxlene is a starting material and a Henkel method in which phthalic anhydride is a starting material. In recent years, there was proposed a process for preparing terephthalic acid by oxidizing a dialkylbenzene, particularly p-xylene, with molecular oxygen in a fatty acid having two to four carbon atoms as solvent in the presence of a cobaltous compound in a relatively mild temperature condition, i.e., at a temperature not higher than 150° C. Such a process includes (a) a method wherein the oxidation is effected in the presence of methylene ketone such as methyl ethyl ketone as proposed in U.S. Pat. Nos. 2,853,514 and 3,036,122, (b) a method wherein ozone is used as initiator as proposed in Japanese Pat. application Publication No. 4963/60, (c) a method wherein the oxidation is effected by addition of acetaldehyde as proposed in U.S. Pat. No. 2,673,217, (d) a method wherein the oxidation is effect by addition of an ether such as diisopropyl ether as disclosed in Japanese Pat. application Publication No. 4465/64, and (e) a method wherein the oxidation is effected in the presence of a great quantity of a cobalt salt as proposed in U.S. Pat. No. 3,334,135.

Terephthalic acid produced by any of these methods contains colored impurities and impurities which form colored matters, and is unsuitable for preparation of a linear polyester having an excellent whiteness by direct esterification thereof.

We have preformed research with respect to the refining of crude terephthalic acid produced by the methods (a) –(e) mentioned above by using a cobaltic compound catalyst, and found that when there is employed a refining method wherein the oxidation is effected with molecular oxygen in a liquid phase in an aliphatic monocarboxylic acid having two to four carbon atoms, terephthalic acid in the system is refined with a remarkable effect when contacted with molecular oxygen at a specific temperature in the state of suspension, and that at temperature exceeding either the upper or lower limit of the specific range, the refining is completed only to an insufficient degree. We have thus proposed a process for preparation of refined terephthalic acid, which comprises separating crude terephthalic acid from a reaction mixture containing the crude terephthalic acid obtained by oxidation of p-dialkylbenzene with molecular oxygen in an aliphatic monocarboxylic acid having two to four carbon atoms in the presence of a cobaltic compound, and contacting a suspension maintained at a temperature of 180° to 230° C. consisting of 6–100 parts by weight of the crude terephthalic acid and 100 parts by weight of at least one aliphatic monocarboxylic acid selected from the group consisting of acetic acid, propionic acid and butyric acid or an aqueous solution of the aliphatic monocarboxylic acid containing not more than 50 percent by weight, preferably not more than 30 percent by weight, of water, with molecular oxygen.

To carry out such a refining process continuously, it is required that the reaction apparatus to be used should be such that (1) there is sufficient contact between a gas and a suspension, (2) solid particles are sufficiently suspended and dispersed in a liquid, (3) a liquid phase takes the form close to the plug flow (4) the operation is stable, etc.

Heretofore, such apparatuses as a bubbling tower, plate tower and agitation vessel have been employed to contact a gas with such a suspension, but because of the defects of these apparatuses as mentioned at the outset of the specification, it has be extremely difficult to satisfy the conditions (1), (2), (3) and (4) mentioned above. )

We have found that by applying the gas-liquid contacting apparatus of the invention to the refining of crude terephthalic acid and setting down appropriate conditions for it, the refining procedure is smoothly conducted on a commercial scale to give terephthalic acid of high purity.

Accordingly, this invention provides apparatus for use with a process for refining crude terephthalic acid which comprises separating crude terephthalic acid from a reaction mixture containing the crude terephthalic acid obtained by oxidation of p-dialkylbenzene with molecular oxygen in an aliphatic monocarboxylic acid having two to four carbon atoms in the presence of a cobaltic compound, and contacting a suspension maintained at a temperature of 180° to 230° C. consisting of 6–100 parts by weight of the crude terephthalic acid and 100 parts by weight of at least one aliphatic monocarboxylic acid or an aqueous solution of the aliphatic monocarboxylic acid containing not more than 50 percent by weight of water, with molecular oxygen, characterized by introducing the suspension into an optional one section of a refining vessel divided into at least two sections in the vertical direction by at least one partition wall which is tapered downwardly, introducing molecular oxygen containing gas into the lower portion of the section at a superficial velocity of at least 0.1 cm./sec., mixing the suspension and gas with each other in the section, feeding the mixture sequentially into the lower portion of other sections through an opening provided at the bottom of the partition wall or through a conduit which extends through two sections and whose end downstream of a stream of a fluid is opened into the lower portion of the other section, withdrawing it from the last section outside the vessel, and thereafter separating terephthalic acid.

The process of refining crude terephthalic acid in accordance with the invention will be detailed in the pages that follow.

STARTING CRUDE TEREPHTHALIC ACID

The crude terephthalic acid or a material containing terephthalic acid used in the refining process of the invention is prepared by oxidizing a known p-dialkylbenzene with molecular oxygen in a fatty acid having two to four carbon atoms in the presence of a cobaltous compound as a catalyst in accordance, for instance, with the before-mentioned methods (a) to (e), for instance, U.S. Pat. Nos. 2,853,514 and 2,673,217.

If the reaction liquor obtained by the oxidation is subjected as it is (without separating terephthalic acid) to the refining treatment of the invention, the terephthalic acid is insufficiently refined, and the objects of the invention cannot be achieved. It is essential therefore that in the present invention, terephthalic acid is separated from a reaction mixture resulting from the oxidation, and the recovered crude terephthalic acid is used as a starting material.

In this case, it is preferable to wash the separated crude terephthalic acid one to several times with a suitable solvent such as water, an aliphatic monocarboxylic acid having two to four carbon atoms or its aqueous solution before using it as a starting material, since it gives rise to an enhanced effect of the invention.

REFINING MEDIUM

A previously mentioned, any of acetic acid, propionic, and n- or iso-butyric acid can be used as a refining medium, the acetic acid being particularly preferred. These media are used ordinarily in substantially pure form either alone or in admixture, but may also be used in the form of an aqueous solution thereof containing not more than 50 percent, particularly not more than 30 percent, by weight of water. When the water content is in excess of 50 percent by weight, the refining effect is lowered, and the objects of the invention cannot be achieved.

REFINING CONDITIONS

As already pointed out, the refining effect is closely related with the ratio of the refining medium to the crude terephthalic acid used in the refining procedure, and the temperature conditions at the time of refining. According to the invention, terephthalic acid of very high purity can be obtained by contacting with molecular oxygen containing gas a suspension maintained at a temperature of 180°to 230° C. consisting of 6 to 100 parts by weight of the crude terephthalic acid and 100 parts by weight of the refining medium (the monocarboxylic acid or its aqueous solution containing not more than 50 percent, preferably not more than 30 percent by weight of water).

The influence on the refining effect of the ratio of the crude terephthalic acid to the refining medium will be discussed below with reference to the experiments in which all parts and percentages are by weight.

Experimental Examples 1 –14

20 parts of p-xylene, 130 parts of acetic acid and 20 parts of cobalt acetate [$Co(OCOCH_3)_2 \cdot 4H_2O$] were charged into a stainless steel pressure reactor equipped with a gas-blow inlet at the lower portion and an agitator. While the temperature was being maintained at 120° C., air was introduced thereinto at a pressure of 20 kg./cm.$^2$G at a rate, calculated as oxygen, of 0.0095 mol/charged p-xylene·min. The agitation was conducted at 1,200 r.p.m. The reaction was continued until there was substantially no appreciable absorption of oxygen. After the end of the reaction, the reaction mixture was withdrawn, and separated into a solid and a liquid by centrifugal separation. The solid was washed with a small amount of glacial acetic acid, and mixed with three times the weight of the solid of glacial acetic acid. The mixture was boiled and refluxed for 20 minutes at normal atmospheric pressure, and hot filtered. The solid was again refluxed in the foregoing manner, hot filtered, and washed to give crude terephthalic acid which was used as the starting material of refining.

In each run, the crude terephthalic acid [having an optical density of 0.480 (5 cm. cell) and containing 0.0192 percent by weight of Co calculated as $Co(OCOCH_3)_2 \cdot 4H_2O$] and pure glacial acetic acid were charged into a titanium pressure vessel at the ratio indicated in table 1 below. Air was introduced to the pressure of 12 kg./cm.$^2$, and the reaction system was agitated for 2 hours at a temperature of 190° C. It was then cooled to 115° C. at a rate of 26° C./min. The product was withdrawn, and filtered. Terephthalic acid was further washed with pure glacial acetic acid, boiled together with distilled water, filtered, again washed with distilled water, and dried to give refined terephthalic acid. The optical density (O.D.) of the so obtained refined terephthalic acid is also given in table 1.

TABLE 1

| Experimental Ex. No. | Amount of crude phthalic acid (parts by weight) | Amount of glacial acetic acid (parts by weight) | Ratio of the insoluble portion of the charged terephthalic acid (percent by weight) | Optical density of refined terephthalic acid |
|---|---|---|---|---|
| 1 | 2 | 100 | 40 | 0.150 |
| 2 | 3.3 | 100 | 64 | 0.121 |
| 3 | 5.3 | 100 | 78 | 0.103 |
| 4 | 6.6 | 100 | 82 | 0.092 |
| 5 | 10 | 100 | 88 | 0.082 |
| 6 | 11 | 100 | 89 | 0.088 |
| 7 | 20 | 100 | 94 | 0.057 |
| 8 | 25 | 100 | 95 | 0.060 |
| 9 | 33 | 100 | 96 | 0.070 |
| 10 | 43 | 100 | 97 | 0.078 |
| 11 | 54 | 100 | 98 | 0.082 |
| 12 | 67 | 100 | 98 | 0.085 |
| 13 | 82 | 100 | 99 | 0.098 |
| 14 | 122 | 100 | 99-100 | 0.161 |

It is seen from table 1 that the ratio of the crude terephthalic acid to the refining medium (glacial acetic acid) greatly affects the purity of refined terephthalic acid. Table 1 shows that the smaller the optical density of the refined terephthalic acid is, the higher is purity of refined terephthalic acid. In experimental examples 1–3 (outside the scope of the invention), the amount of the crude terephthalic acid was less than 6 parts by weight as against 100 parts by weight of glacial acetic acid, and in experimental example 14 (outside the scope of the invention), more than 100 parts by weight of the crude terephthalic acid was used against 100 parts by weight of glacial acetic acid. In any of these examples, the refined terephthalic acid has a larger optical density than the refined terephthalic acid obtained in any of experimental examples 4–13 (within the scope of the invention). The optical density of refined terephthalic acid refined in experimental examples 1–3 and 14 larger than 0.1, and cannot be used in direct esterification. On the other hand, refined terephthalic acids obtained in experimental examples 4–13 have an optical density of less than 0.1, and can be used in direct esterification.

Table 1 also shows the ratio (percent by weight) of the insoluble portion of crude terephthalic acid based on the glacial acetic acid as the refining medium. This reveals that under the conditions of the invention, most (at least about 80 percent) of the crude terephthalic acid used as the starting material is contacted with molecular oxygen in the insoluble state, and that this will give refined terephthalic acid of higher purity. This was indeed quite unexpected.

The optical density referred to in the present specification was measured at 380 m$\mu$ with a cell length of 5 cm. using 25 cc. of a solution of 1 gram of a specimen in a 14 percent aqueous ammonia solution.

B.

According to the invention, it has been found that there is an important relation between the temperature conditions at the time of refining and the refining effect. This will be shown in the following with reference to experiments.

Experimental Examples 15–25

A titanium pressure vessel was charged with 6.6 parts of the same crude terephthalic acid prepared in experimental example 1 [having an optical density of 0.480 (5 cm. cell) and containing 0.019 percent of Co calculated as $Co(OCOCH_3)_2 \cdot 4H_2O$a and 100 parts of glacial acetic acid, and air was introduced thereinto to a pressure of 12 kg./cm.$^2$G. The reaction system was maintained at the temperature indicated in table 2, and agitated for 2 hours. The same treatment procedure as in experimental example 1 was followed. The optical density of the refined terephthalic acid is given in table 2.

TABLE 2

| Experimental Example No. | Refining temperature (° C.) | Ratio of the insoluble portion of crude terephthalic acid (percent by wt.) | Optical density of refined terephthalic acid |
|---|---|---|---|
| 15 | 160 | 91.0 | 0.192 |
| 16 | 175 | 84.0 | 0.128 |
| 17 | 180 | 83.4 | 0.096 |
| 18 | 190 | 82.0 | 0.090 |
| 19 | 200 | 77.4 | 0.077 |
| 20 | 210 | 74.3 | 0.050 |
| 21 | 220 | 60.5 | 0.070 |
| 22 | 230 | 54.5 | 0.098 |
| 23 | 235 | 50.0 | 0.155 |
| 24 | 250 | 28.8 | 0.519 |
| 25 | 261 | 9.1 | 1.231 |

It is seen from the results given in table 2 that even if the amount of the crude terephthalic acid is within the range of the invention (6–100 parts by weight per 100 parts by weight of the refining medium), the optical density of the refined terephthalic acid is larger than 0.1 when the refining temperature is lower than 180° C. (experimental example 15 and 16) and higher than 230° C. (experimental examples 23, 24 and 25) and it cannot be used in direct esterification, and that in contrast thereto, the optical density of the refined terephthalic acid refined at a temperature of 180° to 230° C. in accordance with the invention (experimental examples 17–22) is lower than 0.1, and the terephthalic acid can be used in direct esterification.

It is seen from the results of experimental examples 23, 24 and 25 that a refining temperature of 230° C., the optical density of the refined terephthalic acid is larger than that of the stating crude terephthalic acid (0.1), and when the refining is carried out at a temperature above 230° C., there is an increased formation of colored matters.

It can thus be realized that in the refining of crude terephthalic acid produced with the use of a cobaltic compound as a catalyst, it is important to operate at a refining temperature of 180° to 230° C. with the use of 6–100 parts by weight of crude terephthalic acid as against 100 parts by weight of the refining medium.

OTHER CONDITIONS OF THE INVENTION

Other conditions necessary for practicing the invention will be described in further detail below.

The molecular oxygen containing gas used in the refining of the crude terephthalic acid of the invention may be substantially pure oxygen, or molecular oxygen containing gas which contains an inert gas such as nitrogen and carbon gas. The molecular oxygen may be contained in any proportion. In general, air is the cheapest example of the molecular-oxygen-containing gas. The partial pressure of the molecular oxygen in the system is not limited, but is suitably 1 to 50 atmospheres in general, preferably 1–10 atmospheres.

The total pressure of the reaction vessel for the practice of the invention is expressed by the sum of the vapor pressure of the solvent, the pressure of $O_2$ and the partial pressure of the inert gas. Any pressure is operable in the invention so long as at least a part of the refining medium is maintained liquid in the reaction system. Usually, it is preferably to operate at a total pressure of 5-100 atmospheres.

The refining treatment of the invention can be effected either in the presence or in the absence of a catalyst. As the catalyst, any known liquid-phase air oxidation catalyst can be used, and generally, valency-variable metals such as Co, Mn, Ni, Cr and Pb and their compounds are used. In the present invention, however, the cobalt catalyst remaining in the crude terephthalic acid is sufficient since a cobaltic compound is used as a catalyst in the liquid-phase air oxidation of p-dialkyl-benzene.

The time required for refining, in terms of the time during which the reaction system is maintained at the above-specified temperature, is generally 5 minutes to 5 hours, particularly 20 minutes to 3 hours.

REFINING PROCEDURES OF THE INVENTION

It has been found that if the above-mentioned gas-liquid contacting apparatus of the invention is employed in the process for preparation of refined terephthalic acid which comprises separating crude terephthalic acid from a reaction mixture containing the crude terephthalic acid obtained by oxidation of p-dialkylbenzene with molecular oxygen in an aliphatic monocarboxylic acid having two to four carbon atoms in the presence of a cobaltic compound, and contacting a suspension maintained at a temperature of 180° to 230° C. consisting of 6-100 parts by weight of said crude terephthalic acid and 100 parts by weight of said crude terephthalic acid and 100 parts by weight of at least one aliphatic monocarboxylic acid having two to four carbon atoms and containing not more than 50 percent by weight of water, with molecular oxygen, terephthalic acid of high purity can be obtained continuously with an extremely good efficiency by a simple operation.

According to the refining process of the invention, a suspension (liquid side) of the crude terephthalic acid and molecular oxygen containing gas are fed into the apparatus of the invention as shown in the attached FIGS. 1 to 12 in the manner as described above with reference to the drawings. Specifically, a refined terephthalic acid is obtained by introducing the suspension into an optional one section of a refining vessel divided into at least two sections in the vertical direction by at least one partition wall which is tapered downwardly, introducing molecular-oxygen-containing gas into the lower portion of the secton at a superficial velocity of at least 0.1 cm./sec., mixing the suspension and gas with each other in the section, feeding the mixture sequentially into the lower portion of the other sections through an opening provided at the bottom of the partition wall or through a conduit which extends through two sections and whose end downstream of a stream of a fluid is opened into the lower portion of the other section, withdrawing it from the last section outside the vessel, and thereafter separating terephthalic acid.

In the refining process of the invention, the velocity of the molecular oxygen containing gas should be so determined that (1) solid particles in the suspension are sufficiently suspended and made to float in the aliphatic monocarboxylic acid, and (2) the contacting between the suspension and the molecular-oxygen-containing gas is made sufficient so as to obtain a complete refining effect. To achieve this end, it is necessary in the invention that the superficial velocity of the gas in the column should be adjusted to 0.1 cm.$^3$/cm.$^2$·sec. or higher, preferably not lower than 0.2 cm.$^3$/cm.$^2$·sec. The superficial velocity of the gas, as used herein, means a superficial velocity (cm.$^3$/cm.$^2$ of a gaseous mixture consisting of molecular oxygen containing gas and the vapor of the medium coexistent therewith. Incidentally, the above-mentioned superficial velocity can also be expressed in terms of cm./sec. If the superficial velocity of the gas is in excess of a certain limit, the gas passes through the suspension in the form of a gas column, and the effect of contact between the liquid and the gas deteriorates with the unstability of operation. With increasing power of the compressor, the amount of the medium entrained in the gas becomes larger. It is necessary therefore to choose the superficial velocity at which such phenomena do not occur. In this sense, the superficial velocity of the gas in the column according to the invention is 15 cm./sec. or less, preferably 1 cm./sec. or less.

In the refining process of the invention, it is preferable that the number of sections provided by the partition walls in the apparatuses shown in FIGS. 7-12 is four to 20.

A preferred embodiment of the refining process of the invention will be described with reference to FIG. 13.

Figure 13:
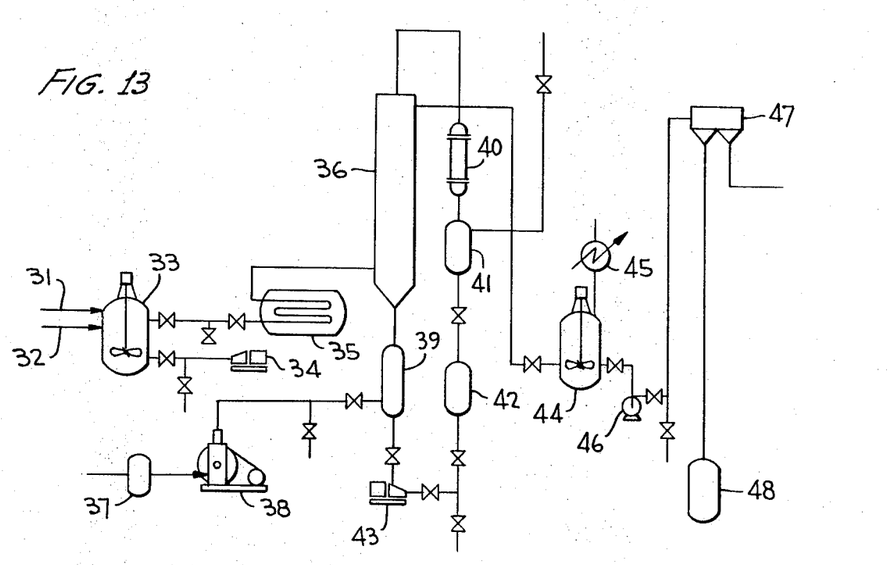

In FIG. 13, the crude terephthalic acid and the aliphatic monocarboxylic acid or its aqueous solution containing 50 percent by weight of water (to be referred to as liquid medium) are fed from lines 31 and 32 into a vessel 33 for preparing a starting suspension. The vessel 33 provides a stirring action necessary for dispersing the solid crude terephthalic acid uniformly in the liquid medium. A suspension prepared in the vessel 33 is conveyed continuously to a preheater 35 by means of a quantitative pump 34, where it is heated to 180°-230° C., and fed into a refining column 36. The preheater 35 is a trombone-type heat-exchanger wherein the suspension flows in a titanium pipe and is heated from outside the pipe by a heat-transfer medium. The refining column 36 has a structure such as shown in FIGS. 7 to 12 and is a titanium vessel equipped with a heating jacket. It is preferable that in the refining column 36, the average residence time of the suspension in the column should be 5 minutes to 5 hours, particularly 10 minutes to 3 hours. A molecular-oxygen-containing gas such as air is sucked into a compressor 38 through a filter 37 so that the pressure inside the refining column 36 is 10-100 kg./cm.$^2$G, particularly 15-50 kg./cm.$^2$G, and the superficial velocity of the gas is 0.1-5 cm./sec., particularly 0.2-1 cm./sec. The pressure is raised, and the gas is heated by a preheating saturator 39 to 180°-230° C. It is substantially saturated with the medium, and fed continuously to the refining column 36. Within the refining column 36, the suspension and the gas are contacted with each other concurrently, and separated from each other in the final section. The gas is conducted from the final section into a condenser 40 were it is cooled. The medium entrained in the gas is mostly condensed, and led to a gas-liquid separator 41. The separated gas is discharged into the atmosphere so that the pressure of the refining column 36 is substantially constant. The condensed medium obtained in the gas-liquid separating device 41 is conveyed into a tank 42 of normal atmospheric pressure. It is continuously fed into the preheating saturator 39 through a quantitative pump 43. Entrained by the gas, it is again fed into the refining column 36. In the refining column 36, the suspension is withdrawn into a flush tank 44 so that the level of the liquid in the final section may be maintained substantially constant. The flush tank 44 is a stainless steel stirring vessel equipped with a condenser 45, and it is preferably to maintain the inner temperature, for instance, at the boiling point of the medium used. The suspension in the flush tank 44, while at a high temperature, is fed into a separator 47 via the pump 46, where refined terephthalic acid is separated from the filtrate. The separated filtrate is sent to a filtrate tank 48. The separated refined terephthalic acid is dried, and made into a final product.

According to the invention, the foregoing operation makes it possible to contact the suspension and the molecular oxygen containing gas with an efficiency higher than any other treatment in which any known liquid gas contacting apparatus is used, and to provide terephthalic acid of high purity continuously.

The refining process of the invention will further be described by the following examples which are presented for the purpose of illustration only.

Unless otherwise specified, all parts and percentages in the examples are by weight.

PART I

Part I shows a series of model experiments for measuring the mass transfer properties and mixing properties of various liquid gas contacting apparatuses.

Example 1

An apparatus for measuring the mass transfer properties of the continuous gas-liquid contacting apparatus of the type shown in FIG. 9 is made of a hard, transparent vinyl chloride resin in which the inner diameter of the tower is 145 mm. and the partition wall is of a conical shape with a vertical angle of 60°, the communication of the liquid and gas being conducted a pipe provided at the bottom of the conical partition wall and having an inner diameter of 3 mm. and a length of 20 mm. On the side surface of the pipe, four slits having a width of 1 mm. and a length of 10 mm. are provided. The number of sections divided by the partition walls and being continuous in the vertical direction is seven, and the distance between two partition walls is 275 mm. Each of the sections includes at its bottom a guide cylinder having an inner diameter of 20 mm. and a length of 100 mm.

Figure 14:
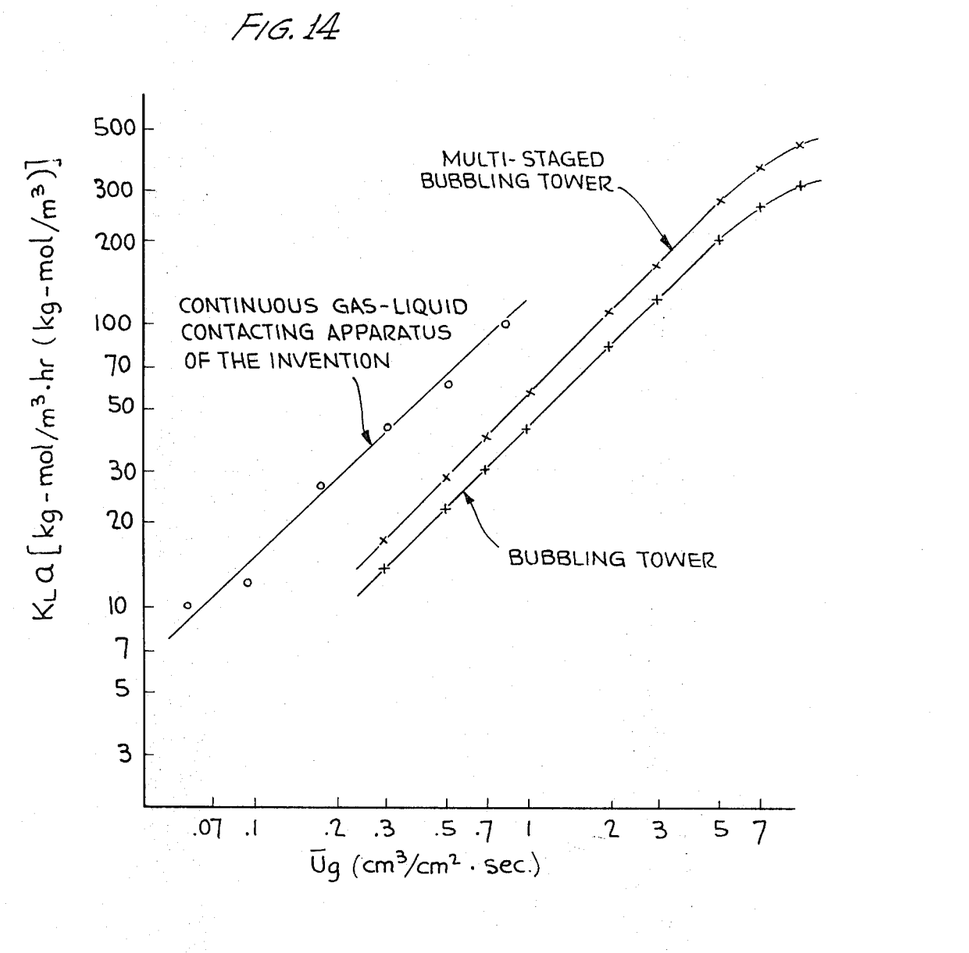
FIG. 14 is a graph showing the comparison of mass transfer properties of the apparatus of the present invention with those of a known gas-liquid contacting apparatus.

Within this apparatus, a 0.2 N sodium sulfite aqueous solution containing $10^{13}$ mol/liter of copper sulfate was contacted concurrently with oxygen gas, and change in concentration of the sodium sulfite was measured. Thereafter, an overall absorption capacity coefficient ($K_LA$) of the oxygen gas in the liquid phase was determined. The values of $K_LA$ measured when the superficial velocity of the gas was varied with the superficial velocity of the liquid maintained at 0.076 cm.$^3$/cm.$^2$·sec. are shown in FIG. 14.

Comparative Example 1

The mass transfer properties were measured by a bubbling tower and a multistaged bubbling tower. The bubbling tower was made of a hard, transparent vinyl chloride resin and had an inner diameter of 137 mm. and a length of 1,096 mm., and the multistaged bubbling tower was constructed by inserting seven perforated plates having 79 apertures with a diameter of 5 mm. and a ratio of opening of 0.105 into the above-mentioned bubbling tower at intervals of 137 mm.

Within this apparatus, oxygen gas was contacted countercurrently with an aqueous solution of sodium sulfite, and $K_LA$ was measured. The values of $K_LA$ measured when the superficial velocity of gas was varied with the superficial velocity of the liquid maintained at 0.340 cm.$^3$/cm.$^2$ sec. are shown in FIG. 13 along with the data obtained with respect to the apparatus of the invention.

Example 2

The mixing properties of the liquid phase at the time when gas is contacted with liquid in the continuous gas-liquid contacting apparatus shown in example 1 were measured by the δ response method.

Water was caused to flow at a superficial velocity of 0.076 cm.$^3$/cm.$^2$·sec., and air was caused to flow at a superficial velocity of 0.3 cm.$^3$/cm.$^2$ sec. concurrently with the water. 20 cubic centimeters of concentrated sulfuric acid was fed in an instant from the liquid inlet. The concentration of the sulfuric acid at the liquid outlet was measured with the lapse of time, whereby δ response was determined.

The δ response $E(\Phi)$ during time $\theta$ in an apparatus where an average residence time of liquid is $\theta_T$ is expressed by the following formula $$E(\phi)(\phi=\theta/\theta_T) = \frac{\text{Concentration of sulfuric acid leaving the apparatus during time } \theta \times \text{Hold-up of the apparatus}}{\text{Total amount of sulfuric acid fed into the apparatus}}$$

Figure 15:
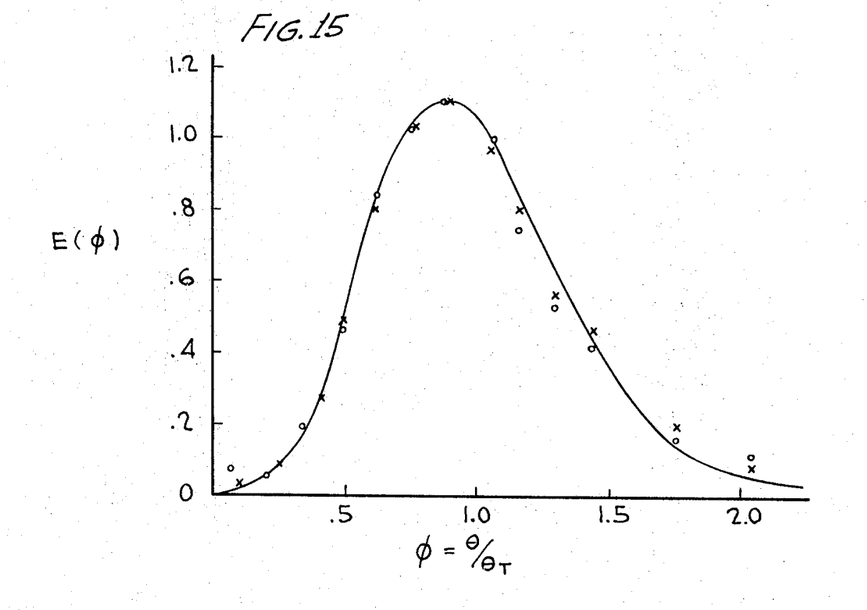
FIG. 15 is a graph showing the mixing properties of the liquid phase and particle phase of the apparatuses of the invention.

The values of the mixing properties of the liquid phase are shown by the mark O in FIG. 15, in which the theoretical values of mixing properties of a seven-staged cell model are illustrated. The values closely correspond with the δ response curve obtained with respect to a seven-stage cell model.

Example 3

The mixing properties of the particle phase of a suspension at the time when gas is contacted with the suspension in the continuous gas-liquid contacting apparatus shown in example 1 were measured. The suspension consisted of terephthalic acid and ethyl ether, and the gas was nitrogen gas. The suspension of 15 parts by weight of terephthalic acid and 85 parts of ethyl ether was caused to flow at a superficial velocity of 0.076 cm.$^3$/cm.$^2$·sec., and the nitrogen gas was caused to flow at a superficial velocity of 0.3 cm.$^3$/cm.$^2$·sec. concurrently with the flow of the suspension. 50 grams of activated carbon having the same particle size distribution as that of the terephthalic acid was fed in an instant from the inlet for the suspension, and an amount of the activated carbon discharged from the outlet was measured with the lapse of time, whereby δ response of the particle phase was measured.

The δ response $E(\Phi)$ during time $\theta$ in an apparatus where an average residence time of the liquid is $\theta_T$ is expressed by the following formula $$E(\phi)(\phi=\theta/\theta_T) = \frac{\text{Concentration of activated carbon during time } \theta \times \text{Hold-up of the apparatus}}{\text{Total amount of activated carbon fed into the apparatus}}$$

The values of the mixing properties of the particle phase are shown by the mark X in FIG. 15 together with the mixing properties of the liquid phase. The values closely correspond with the δ response curve obtained with respect to a seven-stage cell model.

PART II

Part II shows a series of experiments in which the purification of crude terephthalic acid was conducted with the use of the apparatus of the invention.

Examples 4–7

20 parts of p-xylene, 130 parts of acetic acid and 20 parts of cobaltous acetate [Co(OCOCH$_3$)$_2$·4H$_2$O] were fed into a bubbling tower-type stainless steel pressure reactor provided with a gas-blow inlet at the lower part so that the average residence time might be 8 hours. Air was fed thereinto at a superficial velocity of 3 cm./sec. at a temperature of 120° C. and a pressure of 10 kg./cm.$^2$G. The reacted mixture was withdrawn continuously, and subjected to centrifugation to separate a solid from a liquid. The solid was mixed with thrice its weight of acetic acid, and treated for 20 minutes at 80° C. under atmospheric pressure. Thereafter, a solid was separated from a liquid while hot, and the solid was again subjected to the foregoing treatment. It was separated while hot, and washed to give crude terephthalic acid.

15 parts by weight of the so obtained crude terephthalic acid (having a 4-CBA* content of 1.5 percent by weight and an optical density of 0.480) was mixed with 85 parts by weight of a 10 percent water-containing acetic acid to make a suspension which was preheated to a temperature of 220° C. The suspension was treated at a temperature of 220° C. and a pressure of 40 kg./cm.$^2$G with compressed air in the apparatus of the present invention having an internal structure as show in FIG. 8 (number of sections, seven; shape of the partition wall, conical; vertical angle of the partition wall, 60°; connecting opening, a pipe provided with a short pipe having a length of 6 mm. at the bottom of the partition wall; the ratio of diameter of the connecting pipe to the inner diameter of the tower, 0.046; distance between two sections, 1.87 times the diameter of the tower). The superficial velocity of the gas flowing in the tower is indicated in the following table. The treated suspension was continuously withdrawn, and separated into a solid and a liquid. The obtained cake was further suspended in a 10 percent water-containing acetic acid, and the suspension was heated to a temperature of 80° C. followed by treating for 20 minutes under stirring. It was then subjected to a solid-liquid separation, and the obtained cake was dried. The optical density and the 4-CBA content of the obtained crude terephthalic acid in each example are shown in the following table.

*4-carboxybenzaldehyde

| Example | Superficial velocity of gas (cm./sec.) | Optical density of refined terephthalic acid | 4-CBA content of the refined terephthalic acid (percent by wt.) |
| --- | --- | --- | --- |
| 4 | 0.3 | 0.032 | 0.18 |
| 5 | 0.6 | 0.027 | 0.19 |
| 6 | 0.8 | 0.032 | 0.155 |
| 7 | 3.0 | 0.026 | 0.16 |

Examples 8-11

The procedure of example 5 was repeated except that the refining temperature and pressure were varied as indicated in the following table. The results are shown also in the table.

| Example | Temp. (° C.) | Pressure (kg./cm.² G) | Optical density of refined terephthalic acid | 4-CBA content of the refined terephthalic acid (percent by wt.) |
| --- | --- | --- | --- | --- |
| 8 | 185 | 30 | 0.095 | 0.58 |
| 9 | 200 | 30 | 0.070 | 0.40 |
| 10 | 210 | 40 | 0.054 | 0.28 |
| 11 | 225 | 40 | 0.040 | 0.17 |

Comparative Example 2

The procedure of example 4 was repeated except that the gas superficial velocity was 0.08 cm./sec. In 1 hour, there was a difference in pressure of 20 kg./cm.²G between the top of a refining tower and an air preheating saturator. This caused a large fluctuation of an amount of flowing air, and made it impossible to continue the operation.

Examples 12-14

The procedure of example 4 was repeated except for the changes indicated in the following table. The results are shown also in the table.

| Example | Vertical angle of the partition wall (degrees) | Number of sections | Ratio of distance between two sections to the inner diameter of the tower | Optical density terephthalic acid | 4-CBA content of the refined terephthalic acid (percent by wt.) |
| --- | --- | --- | --- | --- | --- |
| 12 | -90 | 14 | 1.0 | 0.026 | 0.16 |
| 13 | 90 | 9 | 1.54 | 0.025 | 0.18 |
| 14 | 60 | 3 | 4.0 | 0.047 | 0.26 |

Example 15

The procedure of example 5 was repeated except with the use of the apparatus of the invention having the structure shown in FIG. 10 (shape of the partition wall, conical; vertical angle of the partition wall, 60°; communicating opening, a pipe having an inner diameter 0.023 time the inner diameter of the tower, one end of which is open at the same level as the bottom of the partition wall in a section situated upstream thereof, and the other end of which is open in the vicinity of the bottom of the partition wall in said section; number of sections, seven; the ratio of the distance between two sections to the inner diameter of the tower, 1.86. The refined terephthalic acid had an optical density of 0.027 and a 4-CBA content of 0.16 percent.

Example 16

The procedure of example 5 was repeated except with the use of the apparatus of the invention having the structure shown in FIG. 8 (shape of the partition wall, conical; vertical angle of the partition wall, 60°; communicating opening, a pipe having an inner diameter 0.023 time the inner diameter of the tower, one end of which is open at the same level as the bottom of the partition wall of a section upstream thereof, and the other end of which is open in the vicinity of the bottom of the partition wall of that section; number of sections, seven; the ratio of the distance between two sections to the inner diameter of the tower, 1.86). The refined terephthalic acid obtained had an optical density of 0.028 and a 4-CBA content of 0.18 percent by weight.

Example 17

The crude terephthalic acid (17.65 parts by weight) prepared in example 4 and 100 parts by weight of a 10 percent water-containing acetic acid were fed into a suspension preparing vessel 33 through lines 31 and 32, respectively, as shown in the flow sheet of FIG. 13. Stirring was effected in the vessel 33 to disperse the solid particles uniformly in acetic acid. The suspension prepared in the vessel 33 was preheated to a temperature of 220° C. by passing through a preheater 35 which is a trombone-type heat-exchanger wherein the suspension is flowed within a titanium-made pipe and the suspension is heated by a heat-transfer medium from outside the pipe. A refining tower 36 is a titanium-made vessel having the same structure as shown in example 1 which is heated by a heating jacket so as to maintain the temperature of the suspension in the tower substantially at 220° C. The average residence time of the suspension in the tower was 35 minutes. Air in an amount such as to provide a pressure in the refining tower of 40 kg./cm.²G and a superficial velocity in the tower of 0.45 cm./sec. was sucked by a compressor 38 through a filter 37. The air was then increased in pressure and heated to 220° C. by an air preheating saturator 39, followed by saturation with acetic acid. The so treated air was then continuously fed into the refining tower 36. The suspension and gas rose in the refining tower while being in concurrent contact with each other, and were separated in the uppermost chamber. The gas was conducted into a condenser 40, and acetic acid entrained in the air was mostly condensed. It was conducted into a liquid-gas separator 41, and the separated air was discharged into the atmosphere so that the pressure of the refining tower was substantially constant. The condensed acetic acid obtained in the liquid-gas separator 41 was supplied to an atmospheric pressure acetic acid tank 42 and continuously fed into the air preheating saturator 39 through a quantitative pump 43. Thus, it was again fed into the refining tower 36 entrained in the air. In the refining tower 36, the suspension was taken up into a flush tank 44 so that the liquid level in the uppermost section was substantially constant. The flush tank 44, which his a stainless steel stirring vessel provided with a cooling jacket and a condenser 45, was cooled by the cooling jacket so that the inner temperature was 100° C. The suspension in the flush tank 44 was fed into a separator 47 via a pump 46, where it was separated into a cake and a filtrate. The filtrate was conveyed to a filtrate tank 48. The cake was slurried with a 10 percent water-containing acetic acid to a slurry concentration of 15 percent by weight, and was treated under stirring for 20 minutes at 80° C. It was then subjected to a solid-liquid separation procedure, and then dried.

The foregoing procedure was carried out for 40 days, and the material balance of acetic acid and a high-boiling matter consisting principally of terephthalic acid was determined. The sum of the amount of acetic acid in the filtrate obtained in the liquid-solid separator 47 and the amount of acetic acid in the water-containing acetic acid evaporated in the dryer and recovered was 89.3 parts by weight. The amount of the refined terephthalic acid withdrawn from the dryer was 17.28 parts by weight. The amount of a high-boiling residue obtained by evaporation to dryness of the filtrate at atmospheric pressure was 0.37 part by weight.

The obtained refined terephthalic acid had an optical density of 0.027 and a 4-CBA content of 0.17 percent by weight.

We claim:

1. Gas-liquid contact apparatus comprising a vertical vessel having a tapered bottom; a first inlet in said vessel for supplying a liquid or suspension thereto; a second inlet in said vessel for feeding a gas thereto to contact the liquid or suspension; at least one tapered partition wall dividing the vessel into at least first lower and second upper substantially closed, vertically superposed sections, said tapered partition wall being closed with the exception of an opening provided at the bottom thereof for conducting the mixture of the liquid or suspension and the gas from said first section to the bottom portion of said second section; and an outlet in said vessel communicating with said second section for withdrawing the gas and the liquid or suspension contacted with the gas.

2. The gas-liquid contacting apparatus as recited in claim 1 wherein said first inlet for supplying the liquid or suspension and said second inlet for supplying the gas communicate with said first section.

3. The gas-liquid contacting apparatus as recited in claim 1 wherein said second inlet for supplying gas is disposed at said tapered bottom of said vessel and a guide cylinder is disposed above said second inlet in said first section.

4. The gas-liquid contacting apparatus as recited in claim 1 wherein a guide cylinder is disposed in said second section above said opening in said tapered partition wall for conducting the mixture of the liquid or suspension and the gas.

5. The gas-liquid contacting apparatus as recited in claim 1 wherein said tapered partition wall has a conical surface with an apex angle of 30° to 90°.

6. The gas-liquid contacting apparatus as recited in claim 1 wherein said vessel is divided into four to 20 sections by a plurality of said tapered partition walls.

7. The gas-liquid contacting apparatus as recited in claim 1 wherein said first section has liquid disposed therein having a surface defined by said opening in said tapered partition wall.

8. Gas-liquid contact apparatus comprising a vertical vessel having a tapered bottom; a first inlet in said vessel for supplying a liquid or suspension thereto; a second inlet in said vessel for feeding a gas thereto to contact the liquid or suspension; at least one tapered closed partition wall dividing the vessel into at least first and second substantially closed, vertically superposed sections; a conduit extending from said first section to the bottom portion of said second section through said tapered partition wall for conducting the mixture of the liquid or suspension and the gas from said first section to the bottom portion of said second section; and an outlet in said vessel communicating with said second section for withdrawing the gas and the liquid or suspension contacted with the gas.

9. The gas-liquid contacting apparatus as recited in claim 8 wherein said first inlet for supplying the liquid or suspension and said second inlet for supplying the gas guide-cylinder with said first section.

10. The gas-liquid contacting apparatus as recited in claim 8 wherein said second inlet for supplying gas is disposed at said tapered bottom of said vessel and a guide-cylinder is disposed above said second inlet in said first section.

11. The gas-liquid contacting apparatus as recited in claim 8 wherein said tapered partition wall has a conical surface with an apex angle of 30° to 90°.

12. The gase-liquid contacting apparatus as recited in claim 8 wherein said vessel is divided into four to 20 sections by a plurality of said tapered partition walls.

13. The gas-liquid contacting apparatus as recited in claim 8 wherein said first section has liquid disposed therein and said conduit has a first end disposed in the bottom portion of said second section and a second end disposed in said first section and defining a surface of said liquid.

S-303

UNITED STATES PATENT OFFICE
CERTIFICATE OF CORRECTION

Patent No. 3,617,033　　　　　　　　　Dated November 2, 1971

Inventor(s) ICHIKAWA ET AL

It is certified that error appears in the above-identified patent and that said Letters Patent are hereby corrected as shown below:

Claim 9, line 3 - "gas guide-cylinder" should read "communicate".

Claim 12, line 1 - delete "gase" (misspelled) and substitute "gas".

Signed and sealed this 9th day of May 1972.

(SEAL)
Attest:

EDWARD M. FLETCHER, JR.　　　　　　ROBERT GOTTSCHALK
Attesting Officer　　　　　　　　　　Commissioner of Patents